United States Patent [19]

van der Heiden

[11] Patent Number: 5,533,270

[45] Date of Patent: Jul. 9, 1996

[54] METHOD AND APPARATUS FOR MEASURING STAIRS

[75] Inventor: A. Th. van der Heiden, Rotterdam, Netherlands

[73] Assignee: Thyssen de Reus B.V., Krimpen aan den Ijssel, Netherlands

[21] Appl. No.: 333,209

[22] Filed: Nov. 2, 1994

[30] Foreign Application Priority Data

Nov. 2, 1993 [NL] Netherlands ............ 9301887

[51] Int. Cl.$^6$ .................................. B43L 7/00
[52] U.S. Cl. ........................ 33/403; 33/424; 33/471
[58] Field of Search ........................ 33/1 N, 1 PT, 33/29, 353, 403, 391, 398, 418, 417, 419, 420, 421, 423, 424, 452, 451, 456, 465, 471, 526, 534, 538, 558.01, 558.2

[56] References Cited

U.S. PATENT DOCUMENTS

| | | | |
|---|---|---|---|
| 53,397 | 3/1866 | Branch, Jr. | 33/424 |
| 147,472 | 2/1874 | Bogy | 33/391 |
| 293,069 | 5/1884 | Patten | 33/418 |
| 1,116,452 | 11/1914 | Lorraine | 33/391 |
| 2,278,440 | 4/1942 | Graves | 33/471 |
| 3,828,436 | 8/1974 | King | 33/353 |
| 5,117,560 | 6/1992 | Nevins | 33/424 |

FOREIGN PATENT DOCUMENTS

| | | |
|---|---|---|
| 1094180 | 5/1955 | France . |
| A3542943 | 6/1987 | Germany . |

OTHER PUBLICATIONS

International Search Report (in German) citing the above–noted references; dated 28 Jun. 1994.

Primary Examiner—William A. Cuchlinski, Jr.
Assistant Examiner—G. Bradley Bennett
Attorney, Agent, or Firm—Merchant, Gould, Smith, Edell, Welter & Schmidt

[57] ABSTRACT

The invention relates to a method for measuring at least one step of a stair, wherein the riser and tread of the or each separate step are determined, characterized in that at least two steps of the stair are provided, in a corresponding manner, with a reference point, whereupon a pin is positioned in each reference point, which two pins cross in a junction in such a manner that of each pin the length between the reference point and the junction is known, whereupon in the plane defined by the pins the angle is recorded that each of the pins includes with a reference line, which reference line includes a known angle, lying in the plane, with the vertical, and to an assembly for carrying out such a method.

22 Claims, 10 Drawing Sheets

$x = A \sin \varphi_1 + B \sin \varphi_2$ $y = A \cos \varphi_1 - B \cos \varphi_2$

FIG. 5

$x_1 = A \sin \varphi_1 + B \sin \varphi_2$ $x_2 = A \sin \varphi_3 + B \sin \varphi_4$ $x_3 = A \sin \rho_1 + B \sin \rho_2$ $y_1 = A \cos \varphi_1 - B \cos \varphi_2$ $y_2 = A \cos \varphi_3 - B \cos \varphi_4$ $y_3 = A \cos \rho_1 - B \cos \rho_2$ $$\alpha = \arccos \left( \frac{x_1^2 + s^2 - x_3^2}{2 x_1 s} \right)$$

METHOD AND APPARATUS FOR MEASURING STAIRS

BACKGROUND OF THE INVENTION

The invention relates to a method for measuring stairs, wherein the riser and tread of the separate steps are determined, and to an assembly for carrying out such method.

For mounting for instance stair elevators, it is important that the form and dimensions of the stair, or at least a number of steps, be univocally and accurately recorded. It is conventional to do so by making a sketch of the stair or steps and writing the measurements and angles therein. This enables a working drawing to be made at another location, for instance on a CAD system or drawing table, for forming the different parts of a fitting stair elevator.

In this connection, it is essential that the measurements included in the drawing exactly correspond to the real dimensions, because otherwise either the stair or the stair elevator should be adapted, which involves considerable inconvenience, costs and delay in completion.

The recording of the dimensions of the separate steps usually takes place by measuring the depth of the step, the so-called tread, and the height of the step, the so-called riser, with for instance a measuring tape or a jointed rule. For this purpose, a lath is positioned at right angles to the front edge of a step in such a manner that the lower side of the lath is level. Subsequently, a second lath is positioned vertically along the front edge of a superjacent step on the first lath. This permits the tread of the subjacent step to be measured along the first lath, and the riser of the superjacent step along the second lath.

When this measuring method is used in practice, it appears that errors are frequently made during measuring, which errors cannot be recognized in time. One of the reasons thereof is that during measuring, two independent dimensions, i.e. the riser and the tread, are also measured independently of each other. This allows for a poor verification afterwards of the dimensions of the stair.

SUMMARY OF THE INVENTION

Hence, the object of the invention is to provide a method for measuring stairs of the type described in the opening paragraph, wherein the above-described problems no longer occur.

To this end, the method according to the invention is characterized in that at least two steps are in a corresponding manner provided with a reference point, whereupon in each reference point a pin is placed, with the two pins crossing in a junction such that of each pin the length between the reference point and the junction is known, whereupon subsequently, in the plane defined by the pins, the angle of each pin with a reference line is recorded, which reference line lies in the plane at a given angle with the vertical.

By measuring the stair in this manner, the horizontal and vertical dimensions of the measured portion of the stair are directly linked by one measurement made, while, if desired, it can be determined by means of only one reference dimension, for instance the total height of the stair, whether the or each tread and riser measured corresponds to reality.

When measuring a stair, providing each two of successive steps with a reference point that can be picked up enables the exact measurement of the riser and tread of each separate step by means of only two reference points, and hence the recording of the exact measurement of both the entire stair and the separate steps.

In this connection, for measuring the successive steps, it is particularly advantageous when after a first step has been measured, one of the reference points is picked up and placed on the following step, located on the other side of the other reference point. As a result, when a following step is measured, one of the reference points always remains in position, so that a possible measuring error, occurring due to an inaccurate positioning of a reference point, only influences the found position of the front edge of the step on which it lies in shifted position, but not the found measuring values of the entire stair.

In the method according to the invention, only very simple and small corrections, if at all, should be made to for instance a stair elevator to be installed or to the stair in the case where a measuring error has indeed been made, because a measuring error has its effect on the dimensions of two steps and not on the dimensions of the entire stair, whereas in the known methods, in such cases, the stair elevator or the stair of even both should be rigorously adapted when measuring errors have been made, as these errors have an effect on the entire stair.

In a preferred embodiment of the method according to the invention, the found angles are converted into length measurements in a simple manner, and the first riser is measured in a known manner, whereupon the sum of the risers and treads respectively is taken. Subsequently, the total height of the stair is determined in a known manner, and compared with the sum of the risers measured. When this comparison shows that the two values compared sufficiently correspond, it can be concluded therefrom that the found treads have been measured sufficiently exactly as well.

The method according to the invention can be further simplified by using a computer especially programmed for that purpose, wherein the measured angles and measurements can be entered, and which computer automatically provides a signal when the comparison of the two values gives a difference greater than a priorly entered value. This reduces to chance of human errors to a high degree.

The invention further relates to an assembly for measuring steps and stairs, in particular according to one of the embodiments of the above-described method. In accordance with the invention, the assembly is characterized in that it comprises two pins interconnected in a swivel point, each pin, at an end spaced from the swivel point at a fixed distance, comprising a positioning point, an angle-measuring device being provided for determining the angle which the respective pins include with a vertical lying in the plane defined by the pins, and the assembly comprising at least two reference elements, each reference element defining a supporting face and comprising a stop, provided at substantially right angles to the supporting face, and at least one reference point for receiving the positioning point of one of the pins.

This apparatus enables steps to be provided in a simple manner with reference points, always in a corresponding manner, while the included angles can exactly be determined in a simple manner by means of the angle-measuring device.

When, in accordance with a further embodiment of the assembly, the angle-measuring device comprises a swivelling arm slewably arranged in the swivel point of the two pins and comprising a spirit level setting mechanism, a protractor being mounted on one of the pins, which protractor extends along the swivelling arm and along the other pin and at least over the maximum angle to be included by the pins during normal use, and the swivelling arm and the other pin being fitted with means for reading their respective positions relative to the protractor, the angles included by the respective pins and the swivelling arm can directly be read from the assembly.

Moreover, it is particularly suitable when the pins and the swivelling arm are detachably connected in the swivel point, with at least the swivelling arm and one of the pins being mountable so as to be rotated about the longitudinal axis through an angle of 180° relative to the other pin in the swivel point. This allows measurements to be performed both to the left and to the right along a stair string by means of one and the same assembly.

According to a preferred embodiment of the method according to the invention, each step is measured both close to the stair string and at some distance therefrom. For this purpose, the reference elements are each provided with a stop face that is preferably of a wider design than the supporting face and that has, on the top side close to or spaced from each end thereof, a cavity for receiving a positioning point. By using this method, both the riser and tread, and the angle included by the front edge of the step and the stair string can be measured and recorded at the same time.

In this connection, it is particularly advantageous if the distance to be referred to as diagonal is also determined between an inner reference point located on one step and an outer reference point located on the other step. This provides the advantage that the diagonal can be used as a reference dimension and that, moreover, the form of the steps can be recorded.

BRIEF DESCRIPTION OF THE DRAWINGS

To explain the invention, exemplary embodiments of the method and the assembly according to the invention will be described hereinafter with reference to the accompanying drawings. In these drawings.

DESCRIPTION OF THE PREFERRED EMBODIMENTS OF THE INVENTION

Figure 1:
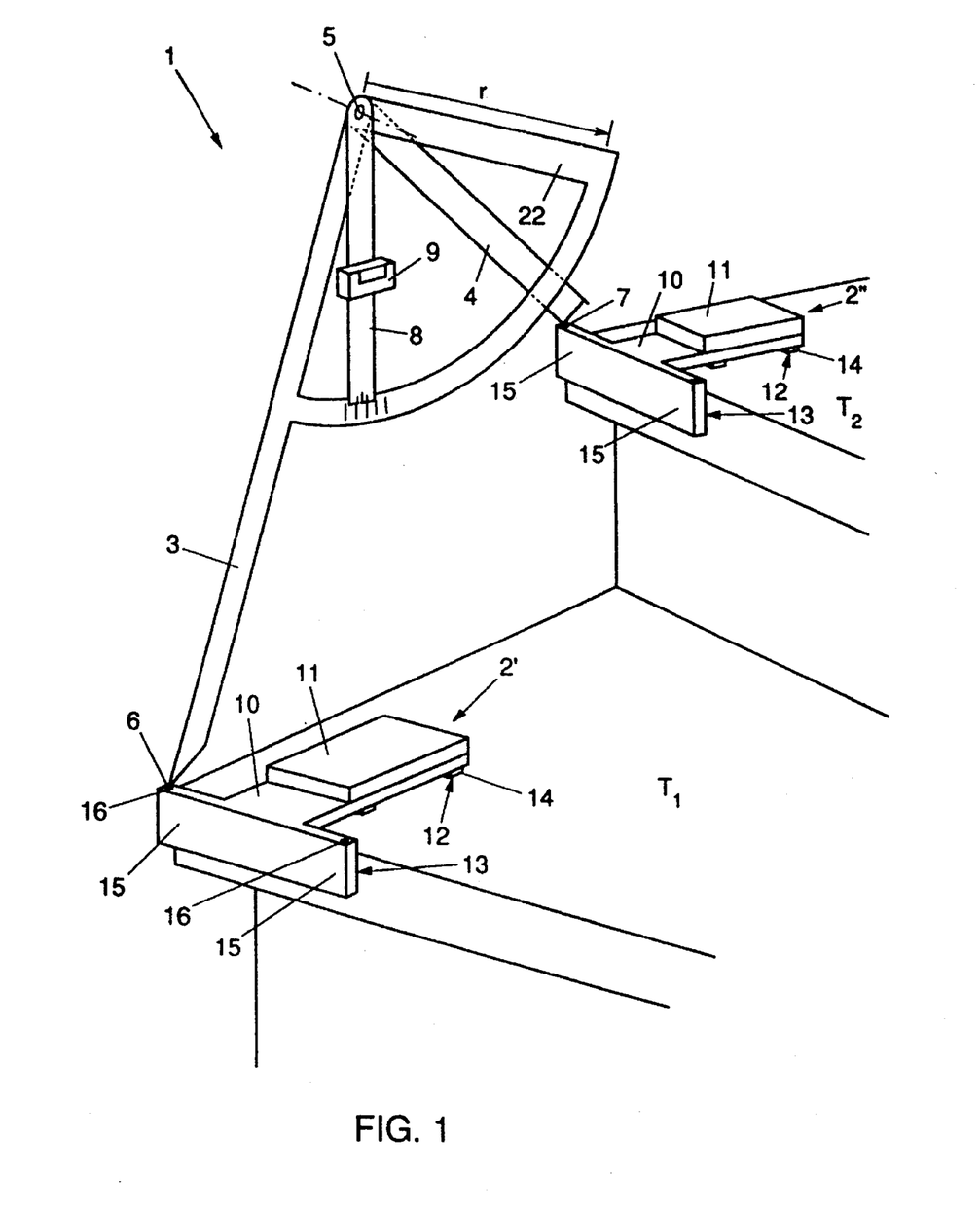
FIG. 1 shows the assembly according to the invention in a side elevation.
Figure 5:
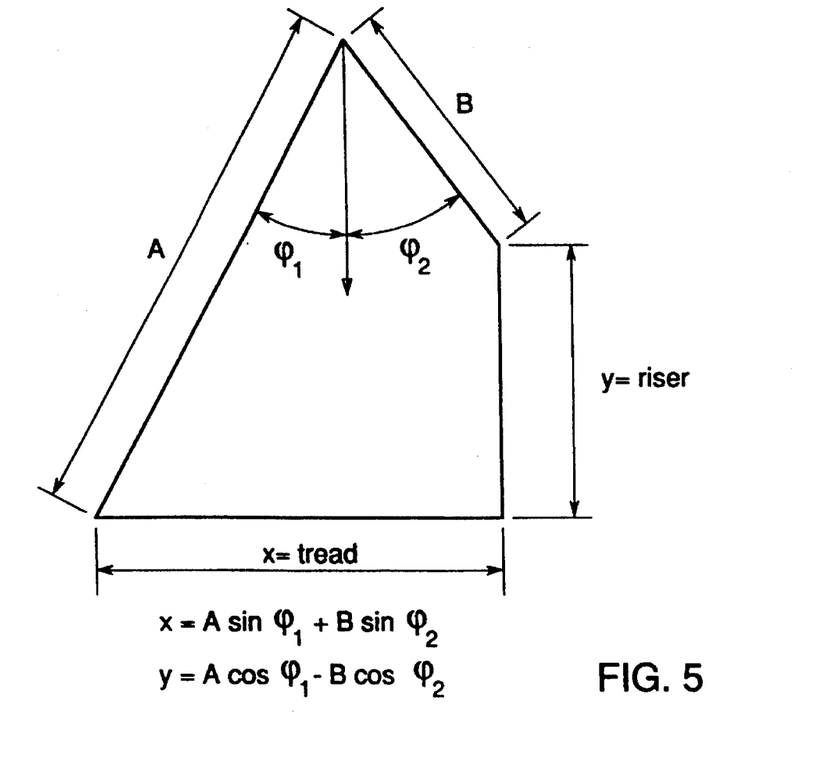
FIG. 5 shows, on the basis of the assembly, the calculation formulae for converting the angles measured into the measurements of the riser and tread of a step measured.

The assembly for measuring steps according to the invention, as shown in FIG. 1, substantially consists of a pair of measuring compasses 1 and at least two reference blocks 2' and 2". The pair of measuring compasses is built up of two pins 3 and 4, slewably connected relative to each other in a swivel point 5. At a known distance A or B respectively from the swivel point, which distance is fixed for the embodiment shown in the drawing, each pin 3 or 4 respectively is provided with a positioning point 6 or 7 respectively (see FIG. 5). The difference between the lengths A and B is preferably greater than the average height of a riser (in the Netherlands this is 195 mm). Attached to the longer pin 3 in the plane defined by the two pins 3 and 4 is a protractor 22, which extends along the other pin 4, has a radius R substantially corresponding to the length B of the shorter pin 4, and includes an angle of, for instance, 90°.

Moreover, in the swivel point 5, a swivelling arm 8 is provided, which extends between the two pins 3 and 4 along the protractor 22 and is slightly shorter than the shortest pin 4. On the swivelling arm 8, a spirit level 9 is detachably mounted, by means of which the vertical position of the swivelling arm 8 can be determined.

Each reference block 2 is substantially built up of a baseplate 10 and a weight 11. The baseplate 10 defines a supporting face 12 and a stop face 13, formed by an edge portion of the baseplate 10 bent over at right angles. In one embodiment, the stop face 13 is slewably fixed to the supporting face 12 by means of a swivel axle P extending at substantially right angles from the supporting face 12. Mounted on the baseplate 10, on the side of the baseplate 10 facing away from the supporting face 12 and spaced from the stop face 13, is the weight 11. Moreover, the supporting face may be provided with friction-increasing strips 14. The weight 11 and, optionally, the strips 14 ensure that the reference blocks will not easily shift, tilt or otherwise change position unintentionally.

The stop face 13 is wider than the supporting face 12, as a result of which an end zone 15 projects beyond the supporting face 12 on both sides of the supporting face 12. Each end zone 15, on the top side close to the free end thereof, is provided with a receiving cavity 16 for receiving one of the positioning points 6 or 7 of the pair of measuring compasses 1, the receiving cavities 16 being spaced apart at a fixed distance S.

Figure 1A:
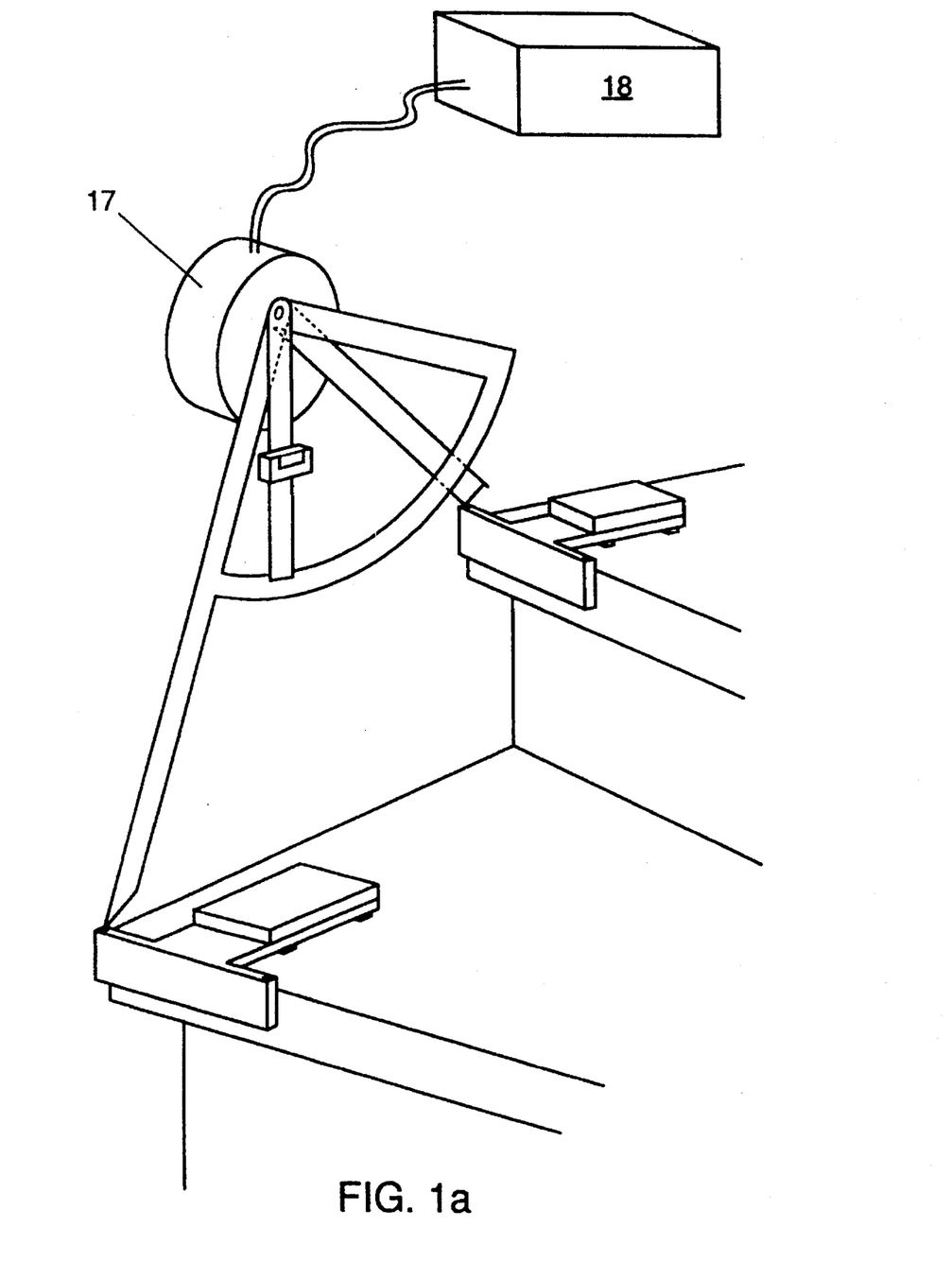
FIG. 1a shows an alternative, electronic embodiment of the assembly.

FIG. 1a shows an alternative embodiment of the assembly according to the invention, wherein the pair of measuring compasses 1 is provided with an electronic angle-measuring device 17, coupled to an electronic processing unit 18, for instance a computer.

In accordance with a preferred embodiment of the method according to the invention, a number of successive stages can be distinguished for measuring steps, as schematically shown in FIGS. 2 and 3. In this connection, it is preferred that a stair is measured from the bottom upwards.

Figure 2A:
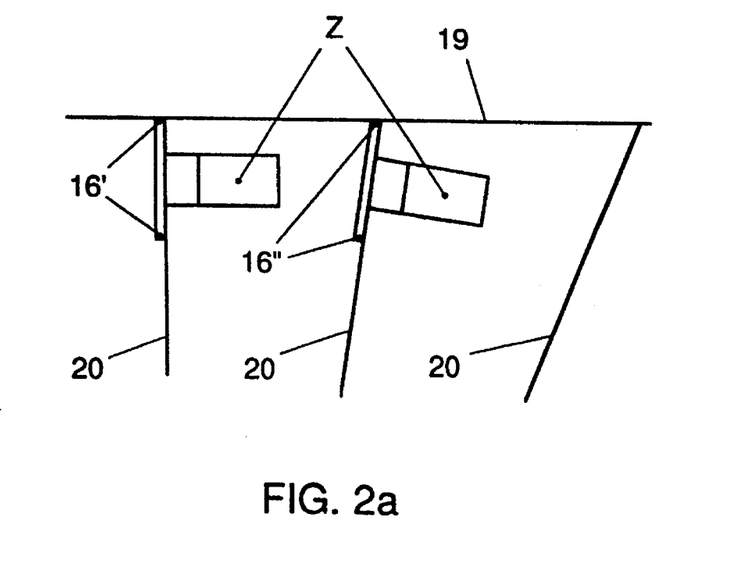
FIGS. 2a–2d show, in top plan view, the assembly according to FIG. 1 in three successive stages of the method according to the invention.
Figure 3A:
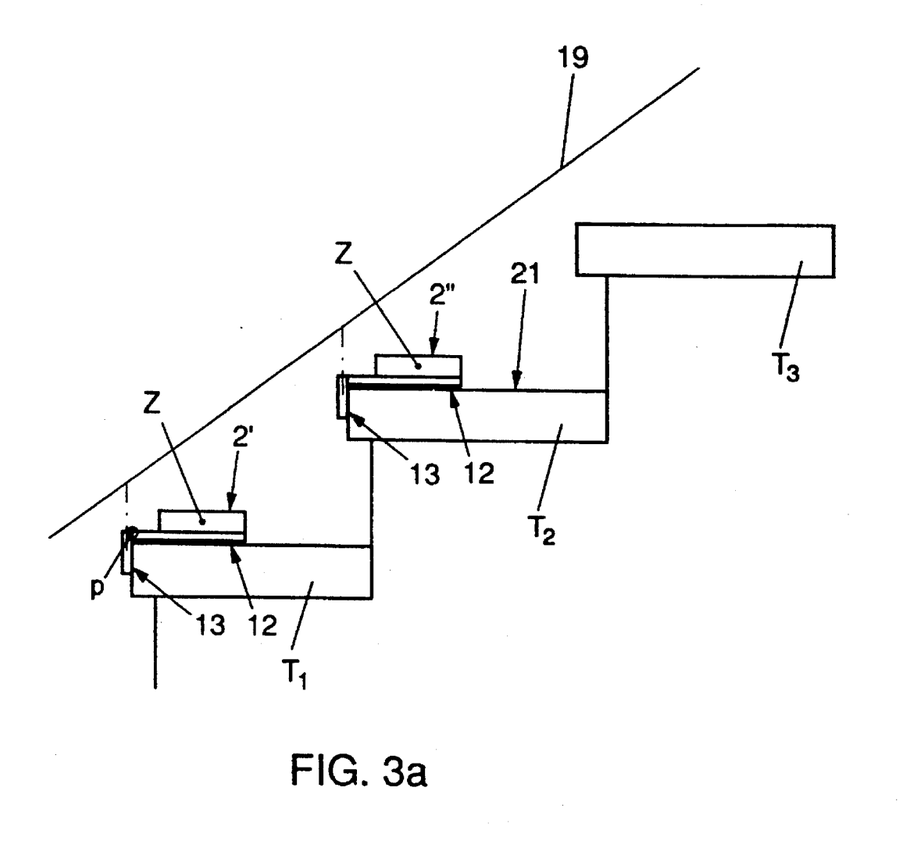
FIG. 3a–3d show the stages according to FIG. 2 in side elevation.

Two successive steps $T_1$ and $T_2$ are each provided with a reference block 2' and 2" respectively, each reference block 2 being disposed on the same side of the steps T with a free end of one of the end zones 15 of the stop face 13 as close as possible against the stair string or newel 19, and against the front edge 20 of the step T. Each reference block 2 is placed with its supporting face 12 as flat as possible on the top face 21 of the step T.

Figure 4:
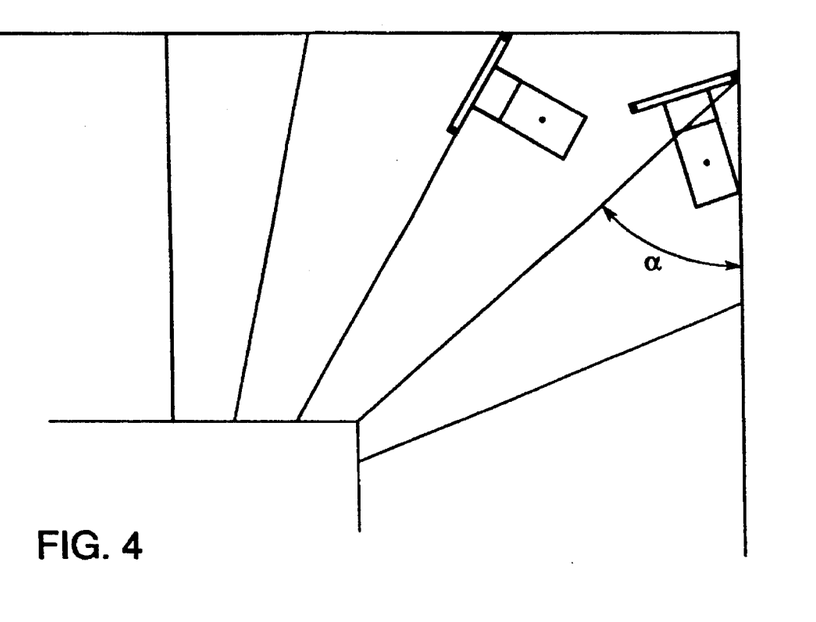
FIG. 4 shows, in top plan view, a special positioning of a reference element on a step.

The position of the center of gravity Z of the weight 11 relative to the stop face 13 permits the reference block 2 to lie on the step T only by a portion of the supporting face 12, the stop face abutting against the front edge 20 only by one side edge of the end zone 15 of the stop face 13, which also allows the accurate arrangement of a receiving cavity 16 on a step T which includes a sharp angle α between the stair string 19 and the front edge 20 (FIG. 4).

Figure 2B:
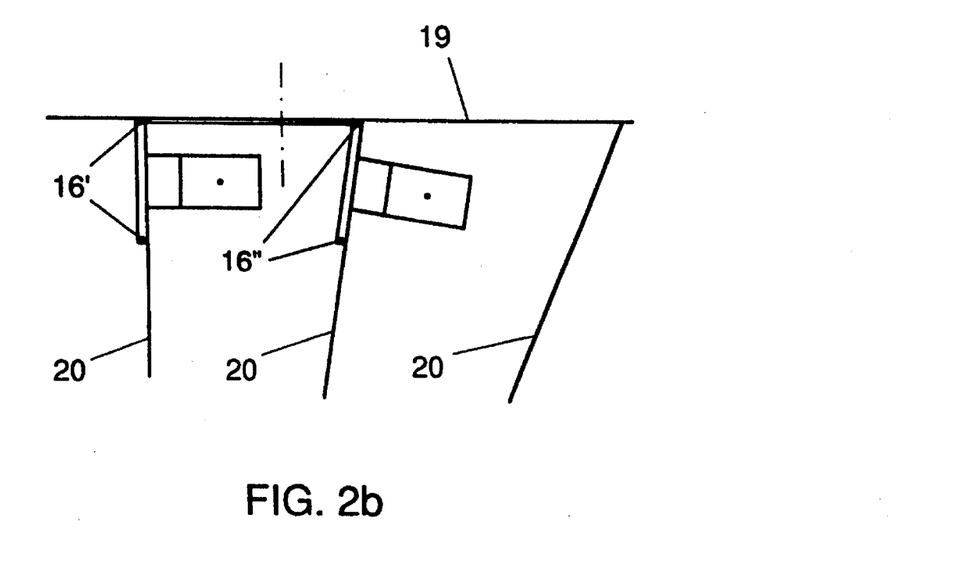
Figure 2C:
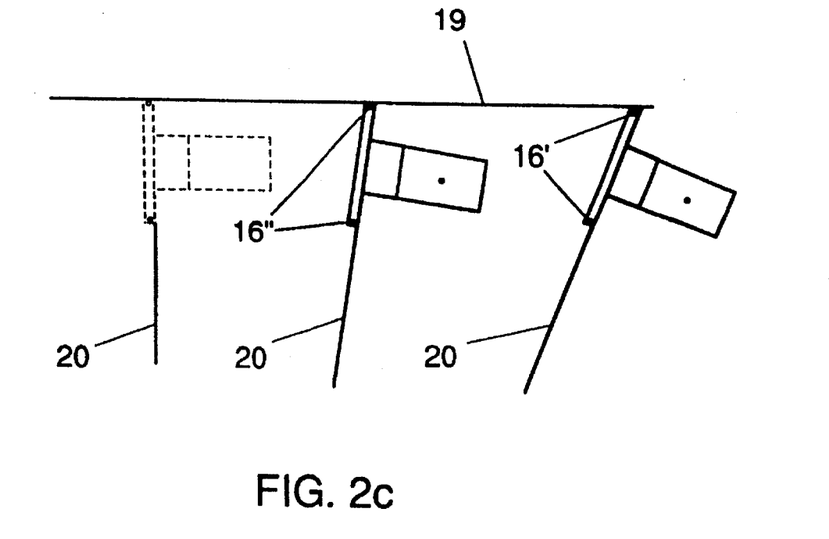
Figure 2D:
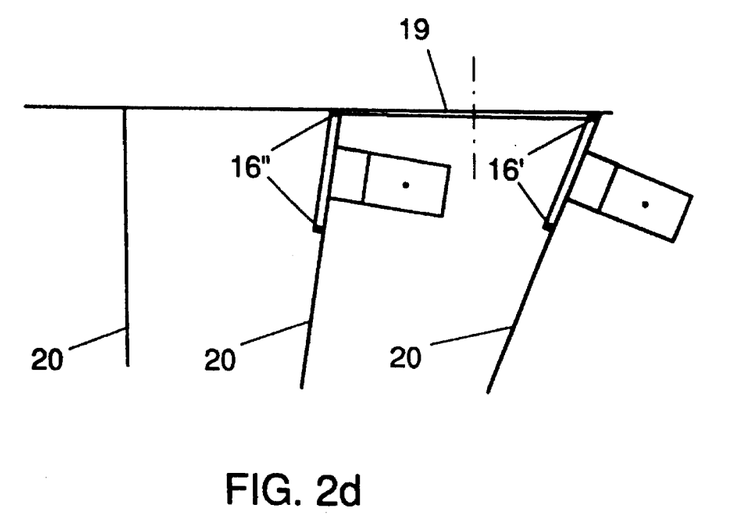
Figure 3B:
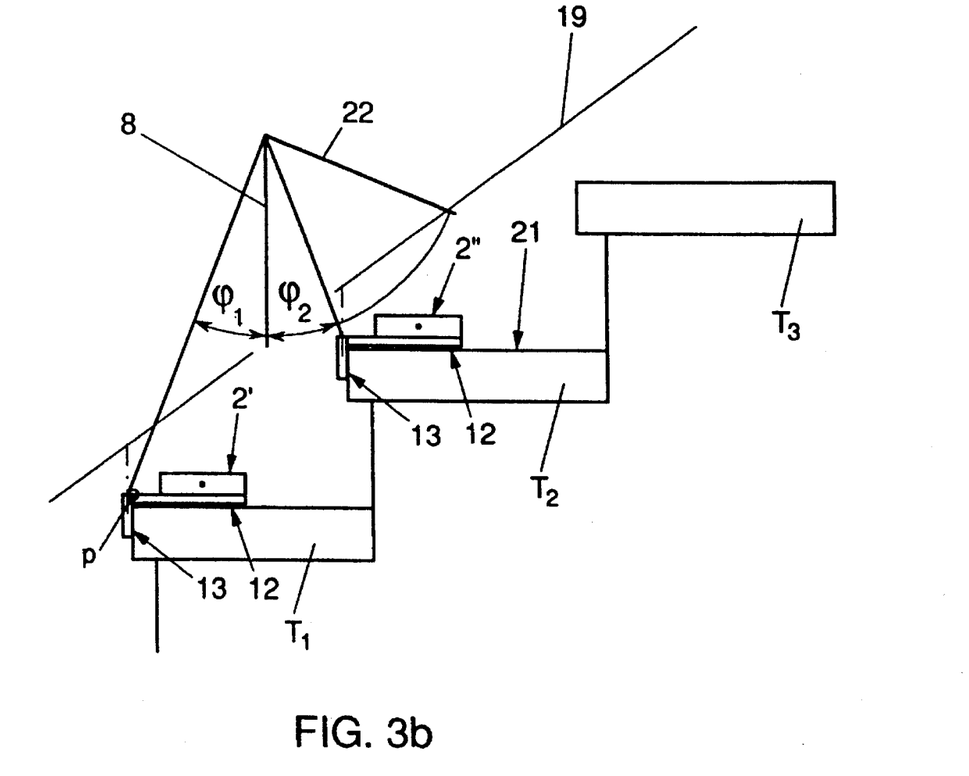
Figure 3C:
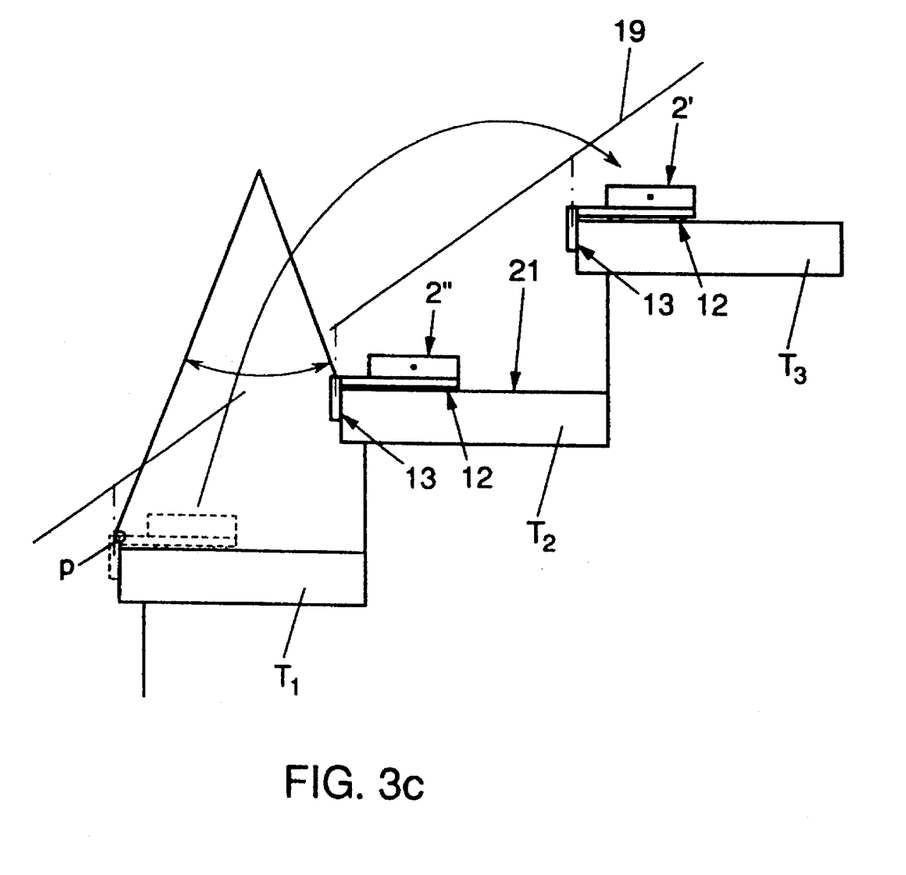
Figure 3D:
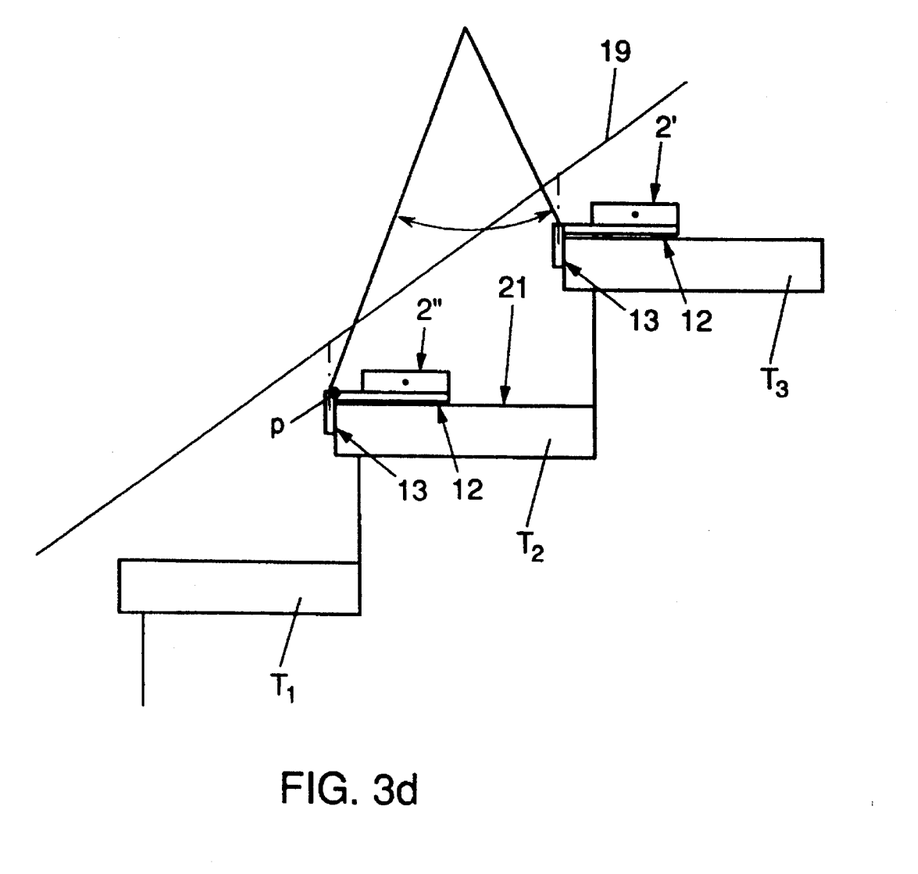

After the reference blocks 2 have been disposed on the two successive steps T, the pair of measuring compasses is positioned, as schematically shown in FIGS. 2b and 3b. The positioning point 6 of the longer pin 3 is placed in the lower receiving cavity 16', disposed close to the stair string 19, and the positioning point 7 of the shorter pin 4 is placed in the upper receiving cavity 16", disposed close to the stair string 19, with the pair of measuring compasses 1 being substantially held in a vertical position.

Subsequently, the swivelling arm 8 is brought into a vertical position by means of the spirit level 9.

After that, the angles $\phi_1$ and $\phi_2$ can be read/measured on the protractor 22, which angles are included by the swivelling arm 8 and the longer pin 3 and the shorter pin 4 respectively. The values measured can be written in a table or typed in the computer 18. When the pair of measuring compasses 1 comprises an electronic angle-measuring device 17, the angles $\phi_1$ and $\phi_2$ measured can be read in the computer directly.

After the values measured have been recorded, the pair of measuring compasses 1 is removed, after which the lower reference block 2' is picked up without the upper reference block 2" being displaced. The picked-up reference block 2' is placed in a corresponding manner on the following step $T_3$, on the other, higher side of the lying reference block 2" (as schematically shown by the arrow in FIG. 3c), after which the pair of measuring compasses 1 is again disposed with the positioning points 6 and 7 in the respective receiving cavities 16" and 16' with, however, the positioning point 6 of the longer pin 3 now being placed in the receiving cavity 16" of the reference block 2" which did not change position (and hence again in the receiving cavity of the subjacent reference block). Subsequently, the angles included, described above, are recorded (FIGS. 2d and 3d).

This method ensures that a deviation in the positioning of a reference block 2 only results in a measuring error which influences the found values of the two steps T located on both sides of the wrongly positioned reference block 2 and not the total height and length of the stair. After all, as the reference block 2 has not changed position, a deviation in the found value for the tread of the subjacent step $T_1$ is compensated by an equally great, yet opposite deviation in the tread of the superjacent step. Consequently, the sum of the two successive treads is equal to the real value. The same applies to the found values of the two successive risers, as a matter of fact.

After all steps have been measured in the above-described manner, the riser of the bottom step T is measured in a known manner. Moreover, one reference dimension is measured, preferably the total height H of the stair. Subsequently, by means of the formulae shown in FIG. 5, the riser and tread of each step are measured, after which the sum of all risers is determined, which sum is compared with the found value for the total height H of the stair. If these two values correspond to a sufficient extent, the values found for the separate risers and treads can be considered to sufficiently correspond to the real values. Should the sum found and the height H not sufficiently correspond, the stair should be measured once again.

Hence, the use of the method according to the invention has the advantage that a check on the accuracy of the measurement can already be carried out at the location of the stair, as a result of which the stair elevator, for instance to be installed on the stair, can entirely be manufactured in a workshop located at a distance without the chance that substantial and costly adaptations are required during the installation.

In accordance with a further preferred embodiment of the method of the invention, the pair of measuring compasses 1 is first placed in the respective receiving cavities 16 on the side of each stop face 13 that is located close to the stair string 19, and subsequently in the receiving cavities 16 on the side of the stop face 13 located at a distance S from the stair string 19, without the reference blocks 2 being displaced. Now, the included angles $\phi_1$ and $\phi_2$, respectively $\phi_3$ and $\phi_4$, are recorded (see FIG. 6). Moreover, at at least one step, but preferably at all steps, the pair of measuring compasses 1 is positioned with one positioning point 6 in the receiving cavity 16, located close to the stair string 19, of one of the reference blocks 2, and with the other positioning point 7 in the receiving cavity 16, spaced from the stair string 19, of the other reference block 2. In this case, too, the angles $\rho_1$ and $\rho_2$, included by the respective pins 3 and 4 and the vertically arranged swivelling arm 8, are recorded.

Figure 6:
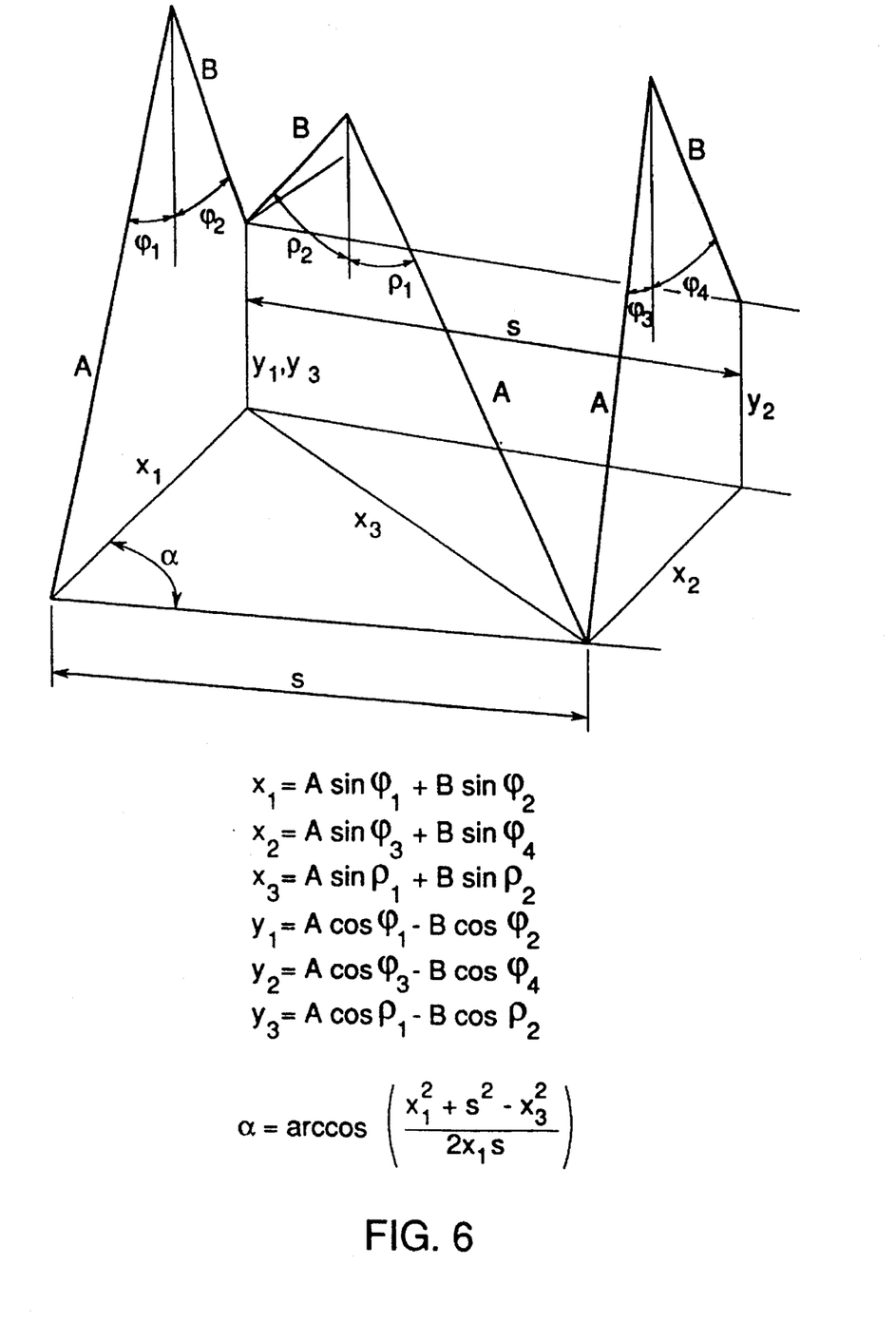
FIG. 6 shows the manner of calculating the angle included by the front edge of the step and the stair string.

Because the stair is double-measured, and the diagonal between two receiving cavities of two successive reference blocks is determined at least once, the angle included by the stair string 19 and the front edge 20 can be recorded in the manner shown in FIG. 6. This has as an advantage that by means of only the assembly the form of the stair can univocally and simply be recorded in a manner permitting checking on the spot. In this connection, it is advantageous if the receiving cavities are spaced apart relatively widely, for instance approximately 500 mm, because this would minimize the influence of a possible curvature in the front edge of the step. However, is it advantageous if as many equilateral triangles as possible are formed by the measurements measured horizontally and the intermediate dimension. For this reason, the intermediate dimension is preferably approximately 210 mm, in view of the average tread measurements in the Netherlands.

Figure 7:
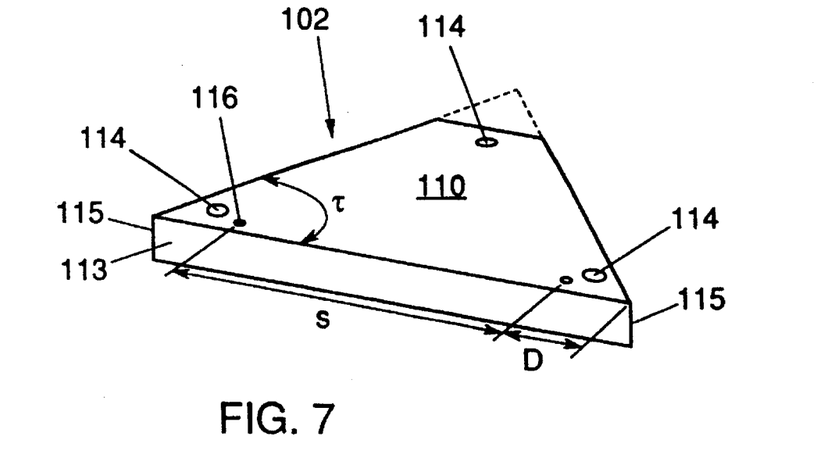
FIG. 7 shows an alternative embodiment of the reference element according to the invention.
Figure 7A:
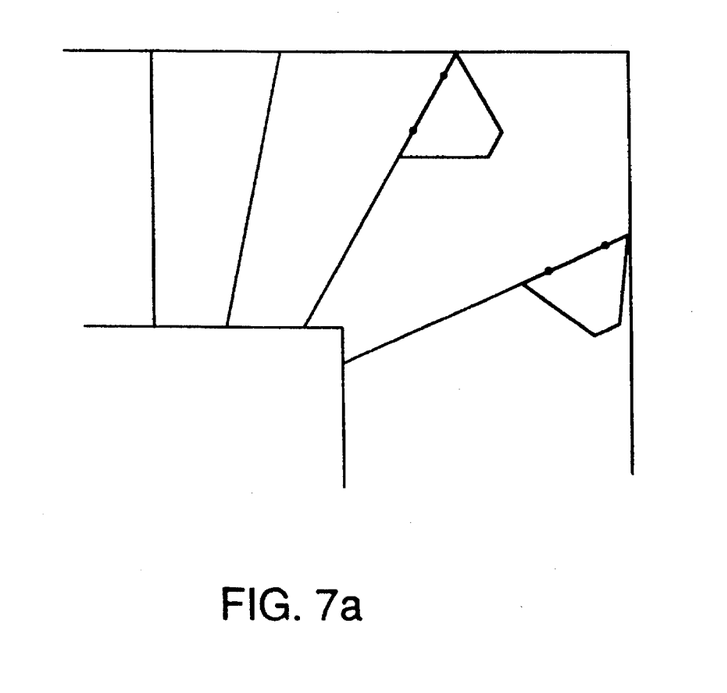
FIG. 7a shows, in top plan view, a special positioning of an alternative embodiment of a reference element on a step.

In a further embodiment of the invention, as shown in FIG. 7, the reference element 102 is formed by a plate 110, one edge zone of the plate 110 being bent over downward at substantially right angles to form a stop face 113. The plate is preferably triangular or trapezoidal, with the sides extending from the stop face 113 including an acute angle τ therewith. Provided on the bottom side are three supporting points 114, allowing an extremely stable positioning of the reference element 102. Two reference points 116, spaced apart at a fixed distance S, are provided on the top side of the plate 110, close to the stop face 113 and at a fixed distance D from the ends 115 thereof. With the acute angle τ, the reference element can readily be disposed against one of the stair strings 19, also in the case of strongly curved stair strings and steps, without adversely influencing the stability of the support and/or the manageability of the assembly (FIG. 7a). Because the reference points 116 lie at a distance D from the stair string or newel 19, the assembly can easily be positioned, also if the adjacent stair string or newel 19 abuts against a wall or stair partition or a like surface.

This embodiment has as an advantage that also in the case where it is disposed on a corner step (FIG. 7a), both reference points lie flush with the front edge of the step, as opposed to the embodiment variant shown in FIG. 4.

Figure 8:
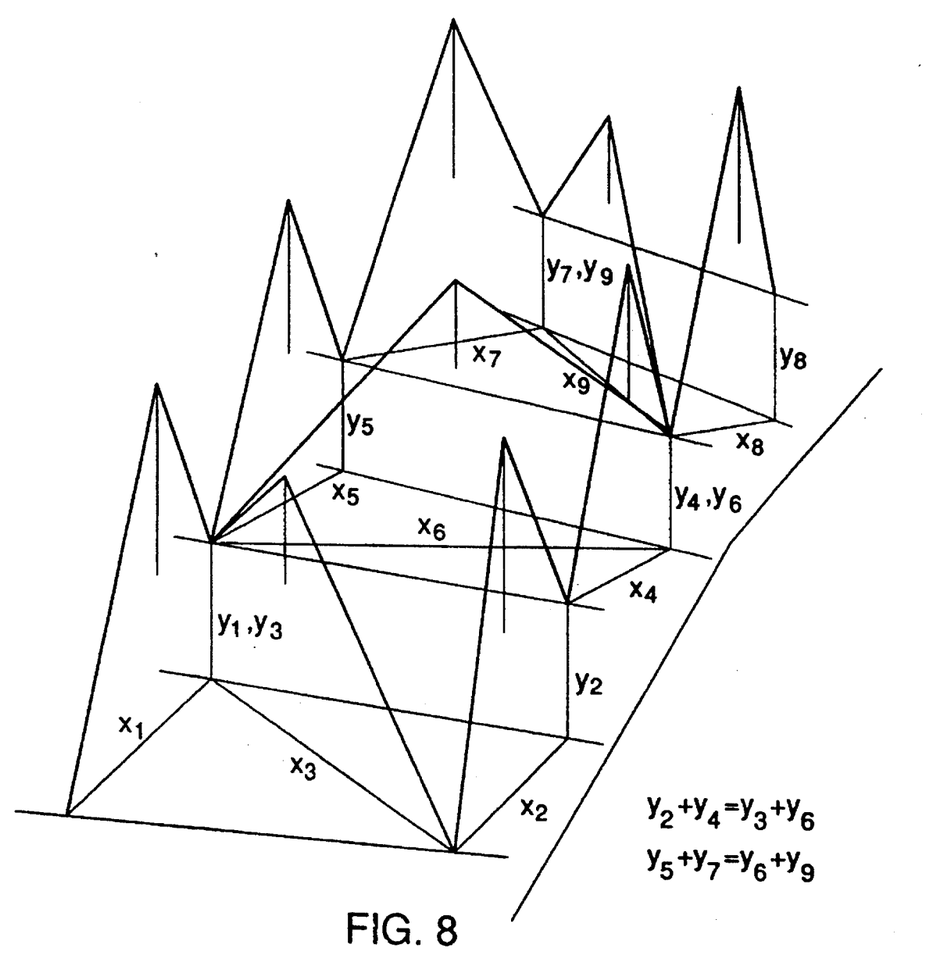
FIG. 8 shows a zigzag measuring pattern of an alternative method according to the invention.

FIG. 8 shows, in perspective view, the zigzag pattern occurring when a particularly advantageous embodiment of the method according to the invention is used. The risers and treads of the steps are measured as described hereinabove, the difference being that the diagonal $(X_3, Y_3)$ for a step $T_1$, viewed in the stair-upward direction, is measured in the direction away from the stair string 19, and that for the adjoining step $T_2$ the diagonal $(X_6, Y_6)$ is measured in the direction toward the stair string 19, and so on up to and including the top step, alternately from and toward the stair string. In other words, viewed over the entire stair, the measured values for the diagonal (X,Y) form a zigzag pattern.

This method has the advantage that it is possible to use the zigzag-measured values as a reference dimension for both the angles of the step itself and the angle between the step and the stair string in horizontal and vertical directions. Hence, in addition to the dimensions, the entire form of the stair can thus be univocally recorded in an accurate and extremely simple manner. This is explained with reference to FIG. 8.

FIG. 8 shows four steps of a stair, on which the pair of measuring compasses 1 is schematically positioned on the steps in nine positions, with indexed letters $X_n$ showing the relevant tread measurements, and indexed letters $Y_n$ showing the relevant riser measurements. By means thereof, the dimensions and the angles between the stair string 19 and the front edge of the steps can be recorded, utilizing the formulae shown in FIG. 6. However, the method according to FIG. 8 moreover achieves the advantage that it can be checked in a simple manner, on the basis of two successively measured riser dimensions, whether the measurements have been carried out correctly. In the given measuring pattern, if measured correctly, it applies that: $(Y_2+Y_4)=(Y_3+Y_6)$ and $(Y_5+Y_7)=(Y_6+Y_9)$. Subsequently, from the horizontal measurements $X_n$ measured, the exact form of each step can be recorded, as a result of which the form of the entire stair can be determined from the values $X_n$ and $Y_n$, and entered in for instance a drawing and production system. Hence, in this method, as a check, it is no longer necessary to take the entire vertical or horizontal measurement of the stair.

The invention is by no means limited to the embodiments described. For instance, the protractor can also be mounted on the short pin or on the swivelling arm, or constructed in two portions moving along one another, each portion being mounted on one of the pins, and instead of the total height of the stair, the total depth of the stair can be taken as reference dimension. Further, the short pin may for instance coincide with the swivelling arm and thus serve as a vertical reference line, the long pin being adjustable in length and angle relative to the short pin. With such a pair of measuring compasses, too, the riser and tread of the step can be calculated on the basis of the angle included and the lengths of the two pins.

I claim:

1. A method for measuring at least one step of a stair, wherein a riser and a tread of each separate stair step are determined, comprising the steps of:
   providing at least two stair steps of the stair in a corresponding manner with a reference point;
   placing two pins in two reference points, said two pins crossing in a junction such that of each pin a length between the reference point and the junction is known; and
   measuring and recording an angle defined by the pins in a plane, each of the pins including a reference line, said reference line including a known angle, lying in the plane, with the vertical.

2. A method according to claim 1, further comprising a step of picking up one of the reference points, without picking up the other pin, in measuring each two successive steps of the stair.

3. A method according to claim 1, further comprising a step of providing each reference point on a front edge of a stair step, on a same side of the stair step and as close as possible to a stair string.

4. A method according to claim 3, for measuring successive stair steps, after measuring a first step, further including steps of picking up one of the reference points and positioning the picked-up reference point on the following, second stair step, located on the other side of the other reference point.

5. A method according to claim 1, wherein the reference line coincides with the vertical.

6. A method according to claim 1, further comprising a step of calculating measurement of the tread and riser of each stair step according to formulae;

$X = A.\sin \Phi_1 + B.\sin (\Phi_2 - \Phi_1)$; and
   $Y = A.\cos \Phi_1 - B.\cos (\Phi_2 - \Phi_1)$ wherein:
   X=tread (cm)
   Y=riser (cm)
   A=length of pin 1 (cm)
   B=length of pin 2 (cm)
   $\Phi_1$=angle (o) included by pin 1 and the vertical
   $\Phi_2$=angle (o) included by pin 2 and the vertical.

7. A method according to claim 6, wherein a stair is measured from a bottom stair step, the riser of the bottom stair step being measured and, subsequently, the measurements being taken from the first stair step up to and including the last stair step of the stair.

8. A method according to claim 7, wherein a vertical length of the entire stair is measured, said length being compared with a sum of the measurements of the separate risers of the separate stair steps.

9. A method according to claim 8, further comprising a step of processing values measured by means of a computer, the sum of the lengths of the treads or risers being electronically compared with a relevant total length of the stair, and the computer being programmed to produce a signal when a difference between the sum and the relevant total length of the stair is greater than a predetermined value.

10. A method according to claim 9, wherein the angles are determined electronically and read in the computer.

11. A method for measuring at least one step of a stair, wherein a riser and a tread of each separate stair step are determined, comprising steps of:
    providing at least two steps of the stair in a corresponding manner with at least two reference points, spaced apart at a predetermined distance;
    positioning each inner reference point close to a stair string;
    positioning each outer reference point at a distance from the stair string;
    placing a pin in each inner reference point, said two pins crossing in a junction such that of each pin a length between the inner reference points and the junction is known;
    measuring and recording an angle defined by the pins in a plane, each of the pins including a reference line, said reference line including a known angle, lying in the plane, with the vertical;
    placing a pin in each outer reference points, said two pins crossing in a junction such that of each pin a length between the outer reference points and the junction is known;
    measuring and recording an angle defined by the pins in a plane, each of the pins including a reference line, said reference line including a known angle, lying in the plane, with the vertical; and wherein the riser and the tread are determined both between the inner reference points and between the outer reference points.

12. A method according to claim 11, wherein for at least one stair step, a diagonal distance is determined between one of the inner reference points located on one stair step and one of the outer reference points located on the other stair step by means of:

placing the first pin in the inner reference point and the second pin in the outer reference point, said two pins crossing in a junction such that of the first and second pins a first length between the inner and the junction and a second length between the outer reference point and the junction are known;

measuring and recording an angle defined by the first and second pins in a plane, each of the first and second pins including a reference line, said reference line including a known angle, lying in the plane, with the vertical.

13. A method according to claim 12, wherein the diagonal distance for a stair step is measured in a direction away from a stair string, viewed in stair-upward direction, and for an adjoining stair step in a direction toward the same stair string.

14. A method according to claim 13, wherein the diagonal measurements are alternately used as a reference dimension.

15. An assembly for measuring stair steps and stairs, comprising:

two pins interconnected in a swivel point, each pin, at an end spaced from the swivel point at a fixed distance, comprising a positioning point;

an angle-measuring device being provided for determining angles defined by respective pins and a vertical lying in a plane defined by the pins;

at least two reference elements, each reference element having a supporting face and a stop face provided at substantially a right angle to the supporting face; and at least one reference point, each for receiving a positioning point of one of the pins.

16. An assembly according to claim 15, wherein the angle-measuring device comprises a swivelling arm slewably arranged in the swivel point of the two pins and provided with a spirit level setting mechanism, a protractor being mounted on one of the pins, said protractor extending along the swivelling arm and along the other pin and at least over a maximum angle to be included by the pins during normal use, and the swivelling arm and the other pin being fitted with means for reading respective positions relative to the protractor.

17. An assembly according to claim 15, wherein each of the reference elements includes a plate, the plate having the supporting face and the stop face, one edge zone of the plate being bent over downward at substantially right angle to form the stop face, a weight is disposed on the supporting face and spaced from the stop face.

18. An assembly according to claim 15, wherein the supporting face of each reference element is defined by a plate, one edge zone of the plate being bent over downward at substantially a right angle to form the stop face, the plate being substantially triangular or trapezoidal and having, on a bottom side of the plate, three supporting points, and two reference points being provided on a top side of the plate.

19. An assembly according to claim 15, wherein the stop face is wider than the supporting face, wherein, for forming two reference points, the reference element is provided, on a top side of the plate, close to the stop face and at a fixed distance from two opposite ends plate, with a cavity for receiving the positioning point.

20. An assembly according to claim 16, wherein the pins and the swivelling arm are detachably connected in the swivel point, at least the swivelling arm and one of the pins being mountable so as to be rotated about a longitudinal axis through an angle of 180° relative to the other pin in the swivel point.

21. An assembly according to claim 16, wherein one of the pins in length substantially corresponds to a radius of the protractor and to a length of the swivelling arm, a length difference between the pin and the swivelling arm at least corresponding to a maximum riser permitted.

22. An assembly according to claim 15, wherein the stop face is slewably fixed to the supporting face by means of a swivel axle extending at substantially right angles from the supporting face.

* * * * *

UNITED STATES PATENT AND TRADEMARK OFFICE
CERTIFICATE OF CORRECTION

PATENT NO. : 5,533,270

DATED : July 9, 1996

INVENTOR(S) : Van Der Heiden

It is certified that error appears in the above-identified patent and that said Letters Patent is hereby corrected as shown below:

On the title page, item [75], line 1, "A.Th. van der Heiden" should read --A.T. Van Der Heiden--.

Signed and Sealed this

Twenty-seventh Day of May, 1997

Attest:

BRUCE LEHMAN

Attesting Officer

Commissioner of Patents and Trademarks